US008276483B2

(12) United States Patent
Hecht

(10) Patent No.: US 8,276,483 B2
(45) Date of Patent: Oct. 2, 2012

(54) HAND-HELD POWER TOOL WITH A TOOL HOLDER

(75) Inventor: Joachim Hecht, Magstatt (DE)

(73) Assignee: Robert Bosch GmbH, Stuttgart (DE)

( * ) Notice: Subject to any disclaimer, the term of this patent is extended or adjusted under 35 U.S.C. 154(b) by 334 days.

(21) Appl. No.: 12/670,506

(22) PCT Filed: Jun. 9, 2008

(86) PCT No.: PCT/EP2008/057178

§ 371 (c)(1),
(2), (4) Date: Jan. 25, 2010

(87) PCT Pub. No.: WO2009/015932

PCT Pub. Date: Feb. 5, 2009

(65) Prior Publication Data

US 2010/0225075 A1 Sep. 9, 2010

(30) Foreign Application Priority Data

Aug. 1, 2007 (DE) ..................... 20 2007 010 699 U

(51) Int. Cl.
*B25B 21/00* (2006.01)
*B23B 31/28* (2006.01)

(52) U.S. Cl. ............................................ 81/54; 279/128

(58) Field of Classification Search .............. 81/54, 438; 173/171, 213, 46; 279/128, 2.23, 9.1
See application file for complete search history.

(56) References Cited

U.S. PATENT DOCUMENTS

| | | | | |
|---|---|---|---|---|
| 2,838,082 | A | 6/1958 | Lange | |
| 3,712,386 | A * | 1/1973 | Peters | 173/46 |
| 4,368,784 | A * | 1/1983 | Wunsch et al. | 173/176 |
| 4,754,669 | A * | 7/1988 | Verdier et al. | 81/57.14 |
| 4,976,173 | A * | 12/1990 | Yang | 81/54 |
| 6,154,108 | A * | 11/2000 | Huang | 335/284 |
| 6,550,786 | B2 * | 4/2003 | Gifford et al. | 279/75 |
| 6,668,941 | B2 * | 12/2003 | Phillips et al. | 173/93.5 |
| 6,688,611 | B2 * | 2/2004 | Gifford et al. | 279/71 |
| 6,713,905 | B2 * | 3/2004 | Hirschburger et al. | 310/47 |
| 7,261,023 | B2 * | 8/2007 | Taguchi | 81/451 |
| 7,424,841 | B2 * | 9/2008 | Liu | 81/438 |
| 2004/0012161 | A1 * | 1/2004 | Chiu | 279/30 |
| 2005/0191139 | A1 * | 9/2005 | Hofbrucker et al. | 408/239 A |
| 2006/0076738 | A1 * | 4/2006 | Zhou | 279/45 |
| 2008/0072718 | A1 * | 3/2008 | Liu | 81/438 |
| 2008/0217870 | A1 * | 9/2008 | Shibata | 279/82 |
| 2008/0266841 | A1 * | 10/2008 | Gabriel et al. | 362/120 |
| 2009/0139378 | A1 * | 6/2009 | Chiang et al. | 81/438 |
| 2009/0308629 | A1 * | 12/2009 | Sakamaki et al. | 173/213 |

(Continued)

FOREIGN PATENT DOCUMENTS

DE 8334719 U1 2/1987

(Continued)

*Primary Examiner* — David B Thomas
(74) *Attorney, Agent, or Firm* — Kenyon & Kenyon LLP

(57) ABSTRACT

The invention describes a hand power tool with a drive spindle and an integrated tool holder. The drive spindle can be connected to the tool holder in a rotationally fixed and undetachable manner, and the tool holder has at least one magnet. The drive spindle is connected to the tool holder such that at least one first section of the drive spindle is permanently connected to the tool holder and at least one second section of the drive spindle is present which is at least as long as the first section.

20 Claims, 2 Drawing Sheets

U.S. PATENT DOCUMENTS

2010/0038103 A1* 2/2010 Ueda et al. ...................... 173/46

FOREIGN PATENT DOCUMENTS

| | | | | |
|---|---|---|---|---|
| DE | 4136584 | A1 | * | 5/1993 |
| DE | 20201012 | U1 | | 5/2002 |
| DE | 102004011579 | A1 | | 10/2005 |
| DE | 102005017872 | A1 | | 10/2006 |
| EP | 601349 | A1 | * | 6/1994 |
| EP | 1506843 | A1 | | 2/2005 |
| EP | 1652630 | A2 | | 5/2006 |
| WO | 0037220 | A1 | | 6/2000 |
| WO | 2006111447 | A1 | | 10/2006 |

* cited by examiner

Fig. 3
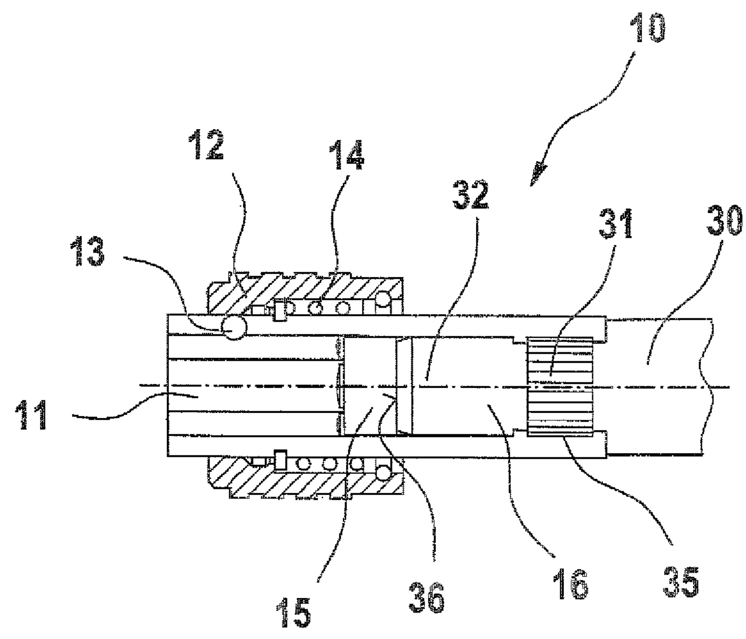
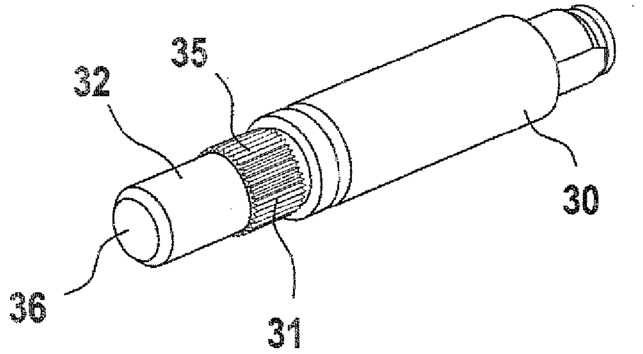
Fig. 4
Fig. 5
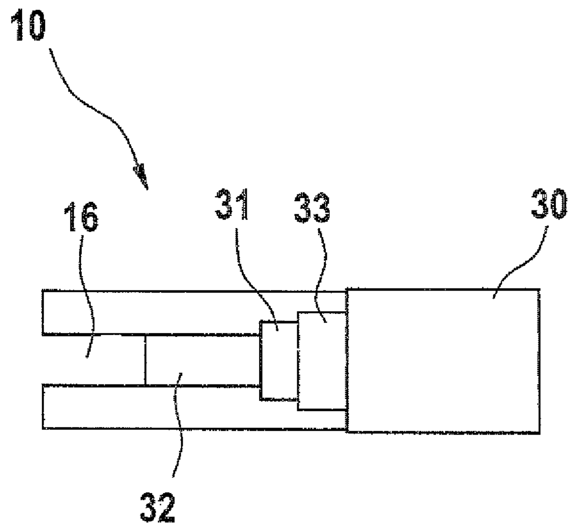

HAND-HELD POWER TOOL WITH A TOOL HOLDER

CROSS-REFERENCE TO RELATED APPLICATION

This application is a 35 USC 371 application of PCT/EP2008/057178 filed on Jun. 9, 2008.

BACKGROUND OF THE INVENTION

1. Field of the Invention

The invention relates to a hand-held power tool having a drive spindle and an integrated tool holder.

2. Description of the Prior Art

The prior art has disclosed hand-held power tools having an integrated tool holder for containing an insert tool such as a screwdriver bit. For example, the tool holder has a hexagonal socket for accommodating hexagonal insert tools. The insert tool is locked in the recess in the axial direction, for example by means of a spring-loaded ball. The tool holder can be a magnetic tool holder with a magnet integrated into the tool holder. This provides an additional securing of the insert tool in the tool holder. In integrated magnetic tool holders, due to their design, only the insert tool is magnetized and held in place. The magnetization is not powerful enough to also magnetize the screw head of a screw to be driven and thus hold it against the insert tool.

The prior art has also disclosed separate magnetic tool holders that are not permanently integrated into the hand-held power tool, but are instead inserted into a socket in the hand-held power tool and fixed for co-rotation. Separate magnetic tool holders of this kind successfully magnetize the screw to be driven. The disadvantage of such tool holders, though, is their design-dictated insufficient rotation characteristics, which result from the fact usually, the drive spindle with the hexagonal profile is press-fitted directly into a bore or the hexagonal profile of the drive spindle is twisted radially in relation to the hexagonal socket of the tool holder and is thus axially compressed.

SUMMARY OF THE INVENTION

The invention is based on a hand-held power tool with a drive spindle and an integrated tool holder in which the drive spindle in a socket can be coupled with the tool holder for co-rotation and the tool holder is equipped with at least one magnet. An integrated tool holder is understood to be a tool holder that can be nondetachably connected to the drive spindle and is thus permanently integrated into the hand-held power tool, e.g. a screwdriver.

The invention makes it possible on the one hand to achieve sufficiently good magnetization of a screw to be driven by the hand-held power tool so that the screw is held against the insert tool (also referred to as a bit) and on the other hand, to achieve sufficiently good rotation characteristics of the tool holder. Good rotation characteristics are understood in particular to mean that at a distance of 40 mm, an ideal bit has less than 0.3 mm concentricity deviation. This is achieved in that the drive spindle can be connected to the tool holder in such a way that at least one first segment of the drive spindle can be connected to the tool holder and at least one second segment of the drive spindle is provided, which is at least as long as the first segment. In particular, the second segment is longer than the first segment. The diameter of the drive spindle can be the same or different in the region of the first and second segment.

Particularly good rotation characteristics are achieved in that the length of the second segment is at least 0.8 times the diameter of the drive spindle in the region of the second segment. The length of the second segment is preferably at most twice the diameter of the drive spindle in the region of the second segment. In principle, the second segment can also be longer than twice the diameter of the drive spindle. This would, however, result in a greater overall length, which would not be desirable for many applications and for many hand-held power tools.

The length of the first segment is preferably at least 0.4 times the diameter of the drive spindle in the region of the first segment.

In order to achieve a good magnetization of the screw to be driven by the hand-held power tool, e.g. a screwdriver, the drive spindle is preferably composed of a magnetizable steel, e.g. austenitic steel. The tool holder is preferably composed of a nonmagnetizable or only poorly magnetizable steel, e.g. V2A steel. In this case, the magnet is accommodated in the tool holder in such a way that it rests against the output end surface of the drive spindle. For this purpose, the diameter of the magnet is selected to be greater than the width of the wrench size of the hexagonal socket for the insert tool. This prevents the magnet from falling out of the hexagonal socket.

To fasten the tool holder to the drive spindle, the tool holder has a socket into which the drive spindle can be press-fitted. Preferably, the first segment is affixed to the tool holder by means of an axial press-fit. To accomplish this, the first segment is preferably provided with an axial knurling. This makes it possible to transmit higher torques. In lieu of a knurling, it is also possible to provide a gearing. Also in lieu of the knurling, a polygonal cross section of the drive spindle can be used, which has a sufficiently large number of sides to prevent the drive spindle from digging into one side of the tool holder socket, which would negatively influence the rotation characteristics.

The second segment, which is either not permanently connected to the tool holder or is connected to the tool holder by means of a radial press-fit, functions as a guide and thus improves the rotation characteristics. If the second segment is affixed in the socket by means of a radial press-fit, then the second segment contributes to the transmission of torque.

In a further embodiment of the hand-held power tool according to the invention, a third segment is provided, which analogous to the second segment of the drive spindle, can be connected to the tool holder by means of a radial press-fit. In this case, the first segment is situated between the second and third segment. This achieves a double centering.

BRIEF DESCRIPTION OF THE DRAWINGS

The invention will be explained in detail below in conjunction with the accompanying drawings, in which:

FIG. 3 is an enlarged sectional depiction of the tool holder according to FIG. 2;

FIG. 4 is a perspective view of the drive spindle; and

FIG. 5 is a schematic depiction of an alternative embodiment of a tool holder.

DESCRIPTION OF THE PREFERRED EMBODIMENT

Figure 1:
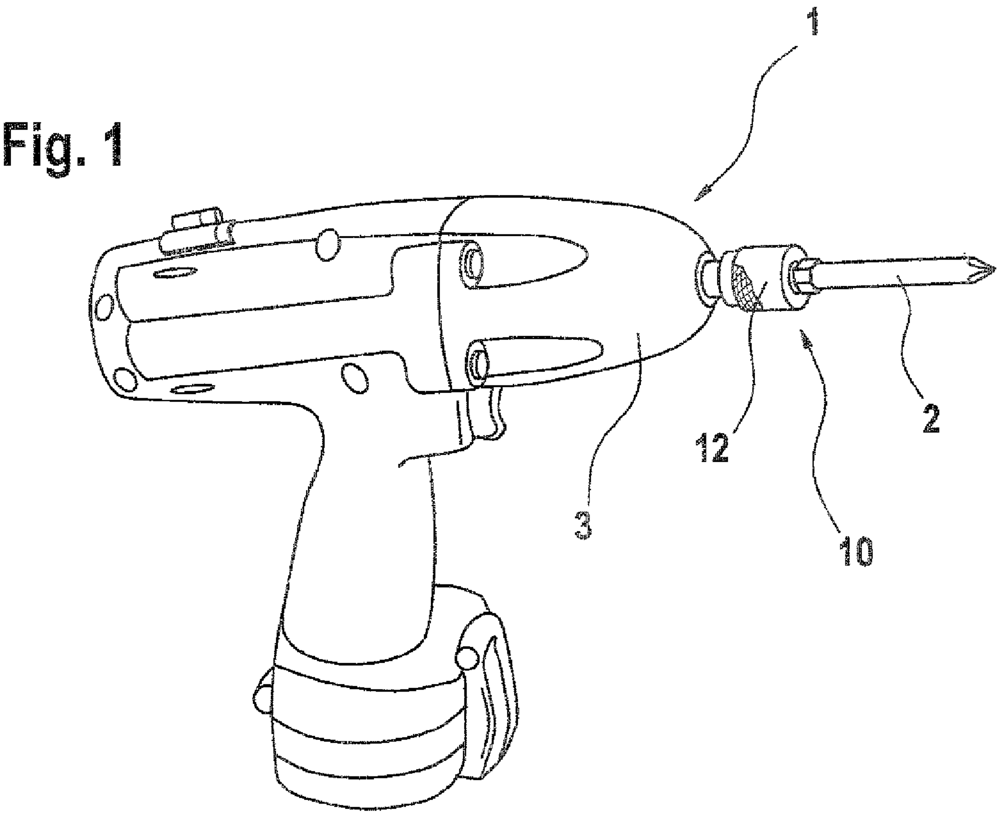
FIG. 1 is a perspective view of a hand-held power tool according to the invention, equipped with a tool holder.

FIG. 1 shows a hand-held power tool 1 in the form of a cordless screwdriver. The hand-held power tool has a tool holder 10 holding an insert tool in the form of a screwdriver bit 2 (also referred to below as a bit for short). The tool holder 10 is integrated permanently into the hand-held power tool 1. It is partly accommodated in the housing 3 of the hand-held power tool 1. The tool holder 10 is a magnetic tool holder.

Figure 2:
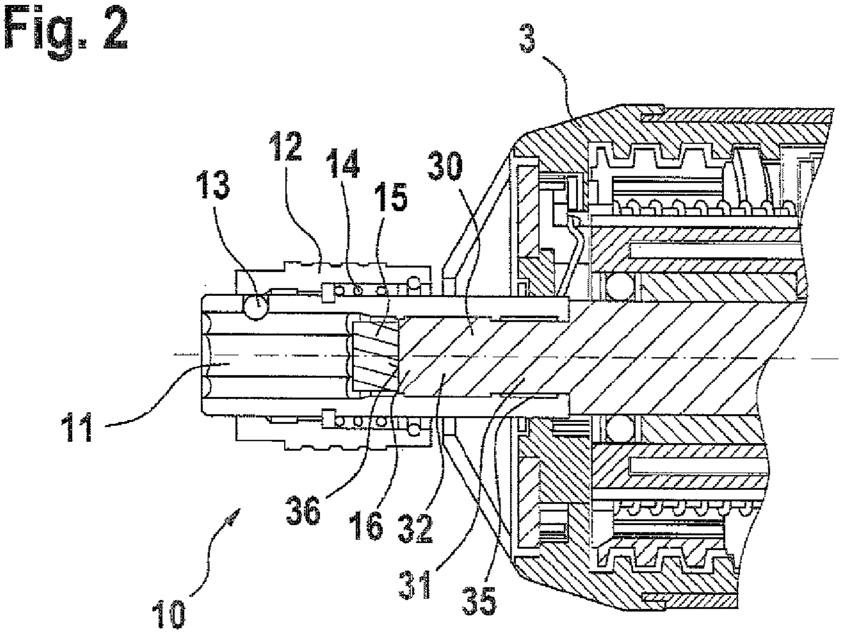
FIG. 2 is a sectional depiction of the tool holder, with the drive spindle.

FIG. 2 and FIG. 3 show enlarged sections of the tool holder 10 without the screwdriver bit. The tool holder 10 has a socket opening 11 for receiving the insert tool in the form of a screwdriver bit 2. The socket opening 11 is embodied as polygonal, in particular hexagonal, in order to accommodate hexagonal bits 2. In order to lock and release a bit 2 in the tool holder 10, an actuating mechanism 12 in the form of an axially slidable sleeve is provided. In the embodiment of the lock and release mechanism shown, the locking occurs automatically upon insertion of the insert tool 2 in that the locking mechanism 13, in the form of a ball here, engages in a corresponding recess (not shown) in the bit 2. In order to unlock the bit 2, the actuating mechanism 12 is moved in the axial direction in opposition to the spring force of the spring 14. In the depiction according to FIG. 2, the actuating mechanism 12 is slid to the left in order for the locking mechanism 13 to release the bit 2.

The tool holder 10 is integrated into the hand-held power tool 1 in that it is nondetachably coupled to the drive spindle 30 for co-rotation. To this end, the tool holder 10 has a socket 16 in which the output end of the drive spindle 30 is accommodated and into which the tool holder 10 is press-fitted. In the socket 16, at least one first segment 31 of the drive spindle 30 is affixed to the tool holder 10 by means of an axial press-fit. For this purpose, the first segment 31 is provided with an axial knurling 35. The length of the first segment 31 is at least 0.4 times the diameter of the drive spindle 30 in the region of the first segment 31.

The drive spindle 30 includes at least one second segment 32 that is at least as long as the first segment 31. The second segment 32 is either not permanently connected to the tool holder 10 or is connected to the tool holder 10 by means of a radial press-fit in the socket 16. The length of the second segment 32 is at least 0.8 times the diameter of the drive spindle 30 in the region of the second segment 32 and is at most twice the diameter of the drive spindle 30, likewise in the region of the second segment 32. It functions as a guide and thus improves the rotation characteristics.

The drive spindle 30 is preferably composed of a magnetizable steel, e.g. austenitic steel. By contrast, the tool holder 10 is preferably composed of a nonmagnetizable or only poorly magnetizable steel, e.g. V2A steel.

In addition, the tool holder 10 has a magnet 15 that is accommodated in the tool holder 10 and rests against the output end surface 36 of the drive spindle 30. The tool holder 10 according to the invention makes it possible to magnetize the insert tool 2 and the screw to be driven (not shown) so that the screw is held against the insert tool 2.

FIG. 5 schematically depicts an alternative embodiment of the tool holder 10 according to the invention. In this case, a double centering is provided in that the drive spindle 30 has a third segment 33, which analogous to the second segment 32 of the drive spindle 30, can be affixed to the tool holder 10 by means of a radial press-fit in the socket 16. In this case, the first segment 31 is situated between the second segment 32 and third segment 33.

The foregoing relates to the preferred exemplary embodiment of the invention, it being understood that other variants and embodiments thereof are possible within the spirit and scope of the invention, the latter being defined by the appended claims.

The invention claimed is:

1. A hand-held power tool comprising:

a drive spindle and an integrated tool holder nondetachably coupled to the drive spindle for co-rotation, wherein the tool holder is equipped with at least one magnet, wherein the drive spindle has at least one first segment connecting the drive spindle to the tool holder and at least one second segment that has a length which is at least as long as the first segment, and wherein the second segment is connected to the tool holder by a radial press-fit.

2. The hand-held power tool as recited in claim 1, wherein the second segment is longer than the first segment.

3. The hand-held power tool as recited in claim 2, wherein the length of the second segment is at least 0.8 times a diameter of the drive spindle in a region of the second segment.

4. The hand-held power tool as recited in claim 2, wherein the length of the second segment is at most twice the diameter of the drive spindle in the region of the second segment.

5. The hand-held power tool as recited in claim 2, wherein the at least one first segment is connected to the tool holder by an axial press-fit.

6. The hand-held power tool as recited in claim 5, wherein the first segment is provided with an axial knurling.

7. The hand-held power tool as recited in claim 1, wherein the length of the second segment is at least 0.8 times a diameter of the drive spindle in a region of the second segment.

8. The hand-held power tool as recited in claim 7, wherein the length of the second segment is at most twice the diameter of the drive spindle in the region of the second segment.

9. The hand-held power tool as recited in claim 7, wherein the at least one first segment is connected to the tool holder by an axial press-fit.

10. The hand-held power tool as recited in claim 9, wherein the first segment is provided with an axial knurling.

11. The hand-held power tool as recited in claim 1, wherein the length of the second segment is at most twice the diameter of the drive spindle in the region of the second segment.

12. The hand-held power tool as recited in claim 11, wherein the at least one first segment is connected to the tool holder by an axial press-fit.

13. The hand-held power tool as recited in claim 12, wherein the first segment is provided with an axial knurling.

14. The hand-held power tool as recited in claim 1, wherein the at least one first segment is connected to the tool holder by an axial press-fit.

15. The hand-held power tool as recited in claim 1, wherein the drive spindle is composed of a magnetizable steel.

16. The hand-held power tool as recited in claim 1, wherein the tool holder is composed of a nonmagnetizable steel.

17. The hand-held power tool as recited in claim 1, wherein the magnet rests against an output end surface of the drive spindle.

18. The hand-held power tool as recited in claim 1, wherein the drive spindle has a third segment which is connected to the tool holder by a radial press-fit, and wherein the first segment is situated between the second and third segments.

19. A hand-held power tool comprising:

a drive spindle and an integrated tool holder nondetachably coupled to the drive spindle for co-rotation, wherein the tool holder is equipped with at least one magnet, wherein the drive spindle has at least one first segment connecting the drive spindle to the tool holder and at least one second segment that has a length which is at least as long as the first segment, wherein the at least one first segment is connected to the tool holder by an axial press-fit, and wherein the first segment is provided with an axial knurling.

20. A hand-held power tool comprising:

a drive spindle and an integrated tool holder nondetachably coupled to the drive spindle for co-rotation, wherein the tool holder is equipped with at least one magnet, wherein the drive spindle has at least one first segment connecting the drive spindle to the tool holder and at least one second segment that has a length which is at least as long as the first segment, wherein the drive spindle has a third segment which is connected to the tool holder by a radial press-fit, and wherein the first segment is situated between the second and third segments.

* * * * *